(12) United States Patent
Batzakis et al.

(10) Patent No.: US 12,122,105 B2
(45) Date of Patent: Oct. 22, 2024

(54) AUTO-ALIGNING VACUUM PRESS

(71) Applicant: The Boeing Company, Chicago, IL (US)

(72) Inventors: Nicholas Batzakis, West Melbourne (AU); Steven W. Mathisen, Geelong (AU); Christian Scheffler, Seaford (AU)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/862,330

(22) Filed: Jul. 11, 2022

(65) Prior Publication Data

US 2022/0347943 A1 Nov. 3, 2022

Related U.S. Application Data

(63) Continuation of application No. 16/791,815, filed on Feb. 14, 2020, now Pat. No. 11,383,462.

(51) Int. Cl.
*B29C 70/34* (2006.01)
*B29C 70/54* (2006.01)
*B30B 5/02* (2006.01)
*B32B 37/10* (2006.01)

(52) U.S. Cl.
CPC ............ *B29C 70/342* (2013.01); *B29C 70/54* (2013.01); *B30B 5/02* (2013.01); *B32B 37/10* (2013.01)

(58) Field of Classification Search
None
See application file for complete search history.

(56) References Cited

U.S. PATENT DOCUMENTS

| | | |
|---|---|---|
| 5,954,917 A | 9/1999 | Jackson et al. |
| 2012/0125534 A1* | 5/2012 | Watson ............... B29C 66/1122 156/583.1 |
| 2016/0354982 A1 | 12/2016 | Prause et al. |

OTHER PUBLICATIONS

U.S. Patent and Trademark Office, Non-Final Office Action regarding U.S. Appl. No. 16/791,815, dated Sep. 22, 2021, 9 pages.
U.S. Patent and Trademark Office, Final Office Action regarding U.S. Appl. No. 16/791,815, dated Dec. 24, 2021, 6 pages.

\* cited by examiner

*Primary Examiner* — Christopher T Schatz
(74) *Attorney, Agent, or Firm* — Kolisch Hartwell, P.C.

(57) ABSTRACT

Auto-aligning vacuum presses, that include a mobile assembly with a first platen, a vacuum docking station with a second platen, a first locating device to guide the mobile assembly to a desired location along the Y-axis as the mobile assembly moves along the X-axis into the vacuum station, and a second locating device to guide one of the first and second platens along the Z-axis into sealing engagement with the other platen.

20 Claims, 10 Drawing Sheets

AUTO-ALIGNING VACUUM PRESS

CROSS-REFERENCE TO RELATED APPLICATIONS

This application is a continuation application of U.S. patent application Ser. No. 16/791,815 filed Feb. 14, 2020 and issued as U.S. Pat. No. 11,383,462 on Jul. 12, 2022. The complete disclosure of the above-identified patent application is hereby incorporated by reference for all purposes.

Field

This disclosure relates generally to the manufacture of composite materials, and more specifically, to vacuum presses employed during composite material manufacture.

Introduction

Engineered composite materials are used in many applications, typically where the composite material can be made stronger, lighter, and/or less expensively than a traditional material. A variety of modern composite materials exist, but the most common are varieties of fiber-reinforced polymer composites, such as fiberglass or carbon fiber composites. In many cases, the composite material is assembled by layering multiple sheets or plies of a partially cured composite material (prepreg). The multiple layers are then consolidated and cured under applied pressure.

Although a variety of compression techniques can be utilized for such manufacture, a common method includes placing the uncured material into a vacuum press. Vacuum presses typically include a lower platen and a flexible upper platen. The uncured composite workpiece is placed on the lower platen, and then the upper and lower platen are engaged to form an airtight seal. Removing the air from between the platens results in the flexible upper platen applying pressure to the workpiece to consolidate the composite materials either prior to or during curing.

Some vacuum presses can require skilled operators in order to ensure that the platens are properly aligned and form the desired airtight seal. In addition, where the upper platen is separate from the lower platen, the tooling and forms used can be sufficiently large that they require overhead handling equipment, such as hoists or cranes to place them properly, often resulting in delays and requiring additional manpower.

Platen alignment can be simplified by connecting the upper platen to the lower platen by a hinge, so that the upper platen need only be lifted to provide access to the lower platen. However, as the lid remains attached to the press at all times, it can therefore interfere with access to the lower platen and the workpiece. Hinged lids can also sometimes require excessive force in order to close the lid of the press, and can be subject to unintended loads and forces while open.

SUMMARY

The present disclosure provides auto-aligning vacuum presses and their use, where the vacuum presses incorporate a mobile assembly and a docking station. The vacuum presses incorporate locating devices that guide the mobile assembly into the proper position for the upper and lower platens of the vacuum press to be positioned for a sealing engagement.

In some examples, the present disclosure relates to a vacuum press, including a mobile assembly having a first platen, a vacuum docking station having a second platen, a first locating device configured to guide the mobile assembly to a desired location along the Y-axis as the mobile assembly moves along an X-axis into the vacuum docking station, and a second locating device configured to guide one of the first and second platens along the Z-axis into sealing engagement with the other platen.

In some examples, the present disclosure relates to a method of pressing a workpiece, including loading a forming tool onto a first platen of a mobile assembly, moving the mobile assembly to a desired location along X- and Y-axes in a vacuum press docking station having a second platen, moving one of the first and second platens along a Z-axis into sealing engagement with the other platen, and pressing a workpiece between the first and second platens.

In some examples, the present disclosure relates to a vacuum press including a mobile assembly including a first platen, and a stationary pressing station including a table portion having a slot and a second platen mounted over the slot, where the mobile assembly is configured to carry a pre-loaded tool on the first platen along at least two orthogonal axes into a vacuum chamber formed by sealing engagement of the first and second platens.

Features, functions, and advantages can be achieved independently in various examples of the present disclosure, or can be combined in yet other examples, further details of which can be seen with reference to the following description and drawings.

DETAILED DESCRIPTION

Various aspects and examples of the disclosed vacuum presses, as well as related methods, are described below and illustrated in the associated drawings. Unless otherwise specified, a vacuum press as disclosed herein, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Examples, Components, and Alternatives; (3) Illustrative Combinations and Additional Examples; (4) Advantages, Features, and Benefits; and (5) Conclusion.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

Examples, Components, and Alternatives

Figure 1:
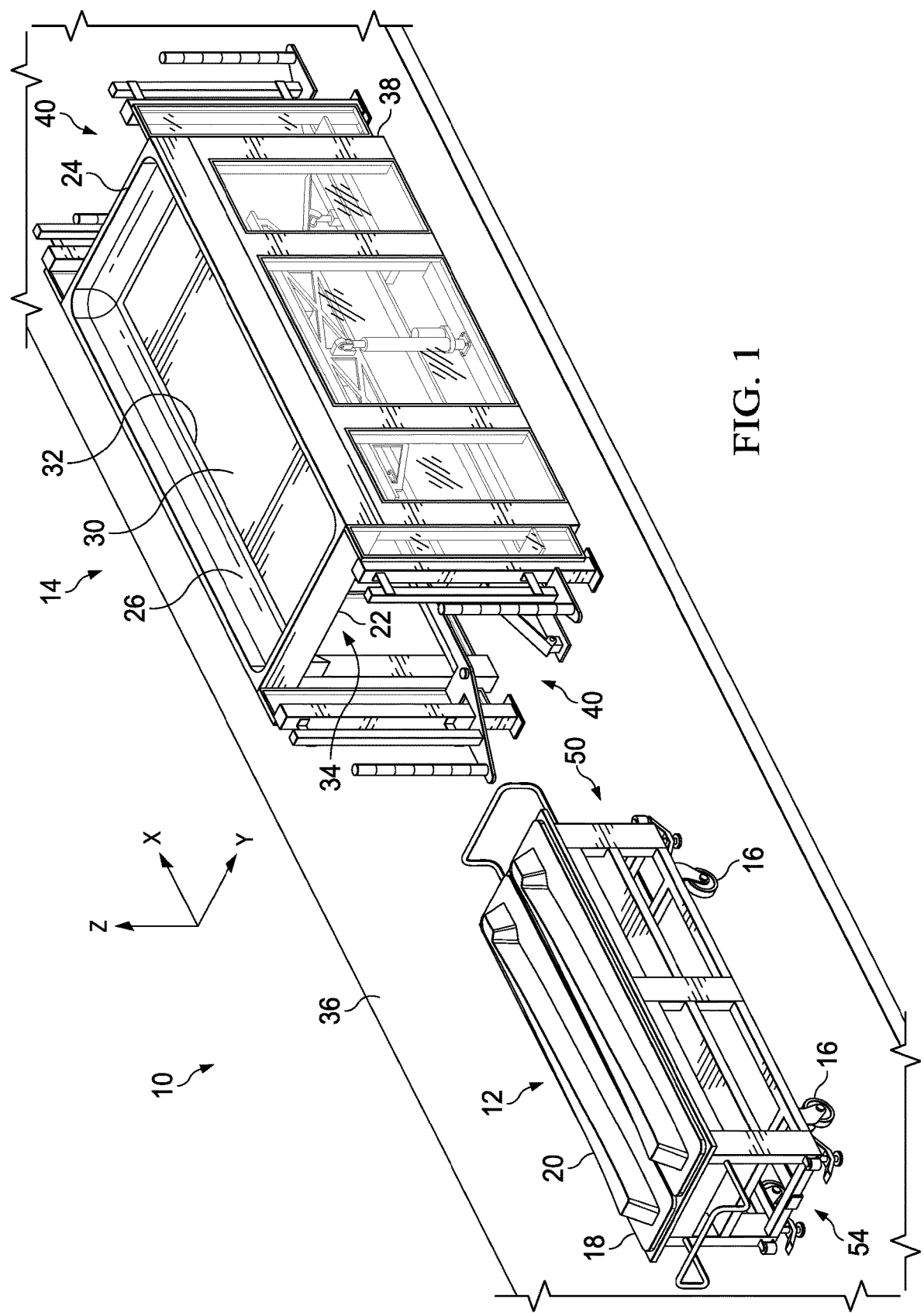
FIG. 1 depicts an illustrative vacuum press according to the present disclosure.

An illustrative vacuum press 10 is depicted in FIG. 1. Vacuum press 10 can include a mobile assembly 12, and a stationary pressing station, or vacuum docking station 14. Mobile assembly 12 can include a plurality of wheels 16 in order to render it readily movable. Mobile assembly 12 can include a first platen 18, that is typically disposed on an upper surface 24 of mobile assembly 12, and first platen 18 is typically configured to support one or more forming tools 20, which can include molds or supports upon which layers of prepreg materials can be assembled for subsequent compression.

Figure 7:
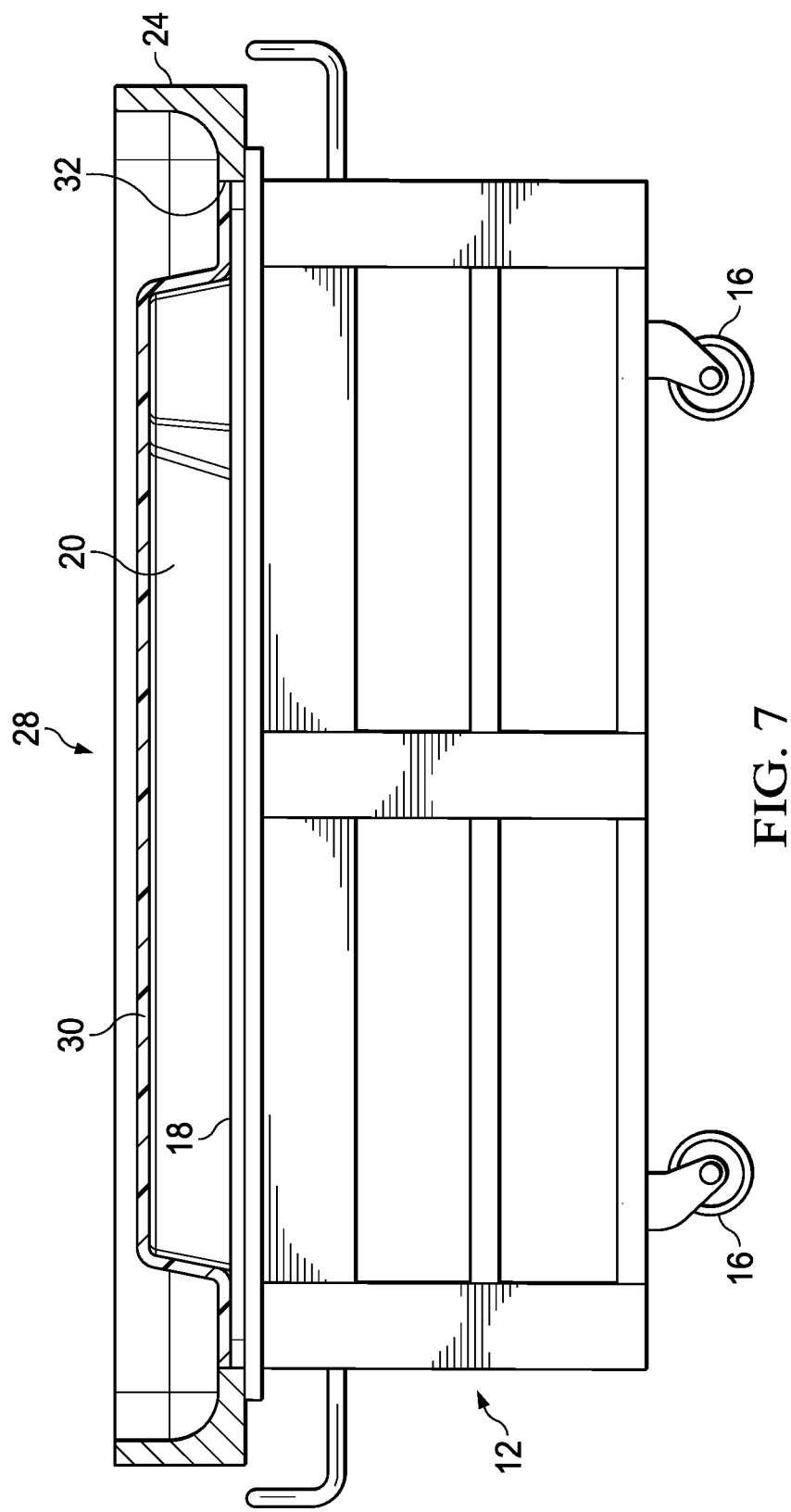
FIG. 7 semi-schematically depicts the mobile assembly in an elevated and aligned position, so that the first platen and the second platen are in sealing engagement, and enclose the forming tools in the resulting vacuum chamber

Vacuum docking station 14 can include a frame or table portion 22 that can support an upper surface 24 that is or includes a second platen 26 that is configured to be complementary to, and capable of sealingly engaging with, first platen 18 on mobile assembly 12. When first platen 18 and second platen 26 are sealingly engaged, the space between first platen 18 and second platen 26 defines a vacuum chamber 28. Second platen 26 can be, or can include, a flexible diaphragm 30 that spans and/or occupies an aperture or slot 32 in upper surface 24. Flexible diaphragm 30 can be configured to conform to the shape of forming tools 20 on first platen 18 when vacuum chamber 28 is evacuated, as shown in FIG. 7.

In addition to providing a frame for supporting second platen 26, table portion 22 of vacuum docking station 14 can additionally define an internal passage 34 that is sized and shaped to receive mobile assembly 12, which can be readily moved, for example by rolling on wheels 16 on a floor 36. Internal passage 34 can be defined by floor 36, a pair of opposing sides 38, a pair of opposing ends 40, and upper surface 24. Table portion 22 can be generally configured so that when mobile assembly 12 is translated into internal passage 34, first platen 18 is disposed generally beneath second platen 26. Vacuum docking station 14 and internal passage 34 can be sized and shaped to receive mobile assembly 12, and can potentially receive and enclose the entirety of mobile assembly 12, but can at least receive and enclose a portion of mobile assembly 12 that includes first platen 18.

A Cartesian reference system will be used to simplify the description of the illustrated vacuum press, and its operation. As used herein, and as shown in FIG. 1, the X-axis extends horizontally and parallel to the direction of travel of the mobile assembly 12 into and out of vacuum docking station 14, the Y-axis extends horizontally and at right angles to the X-axis, and the Z-axis is orthogonal to both the X-axis and the Y-axis and therefore extends vertically up and down. Movement parallel to the X-axis can be said to be movement in the X-direction or along the X-axis, movement parallel to the Y-axis can be said to be movement in the Y-direction or along the Y-axis, and movement parallel to the Z-axis can be said to be movement in the Z-direction, or along the Z-axis.

Figure 2:
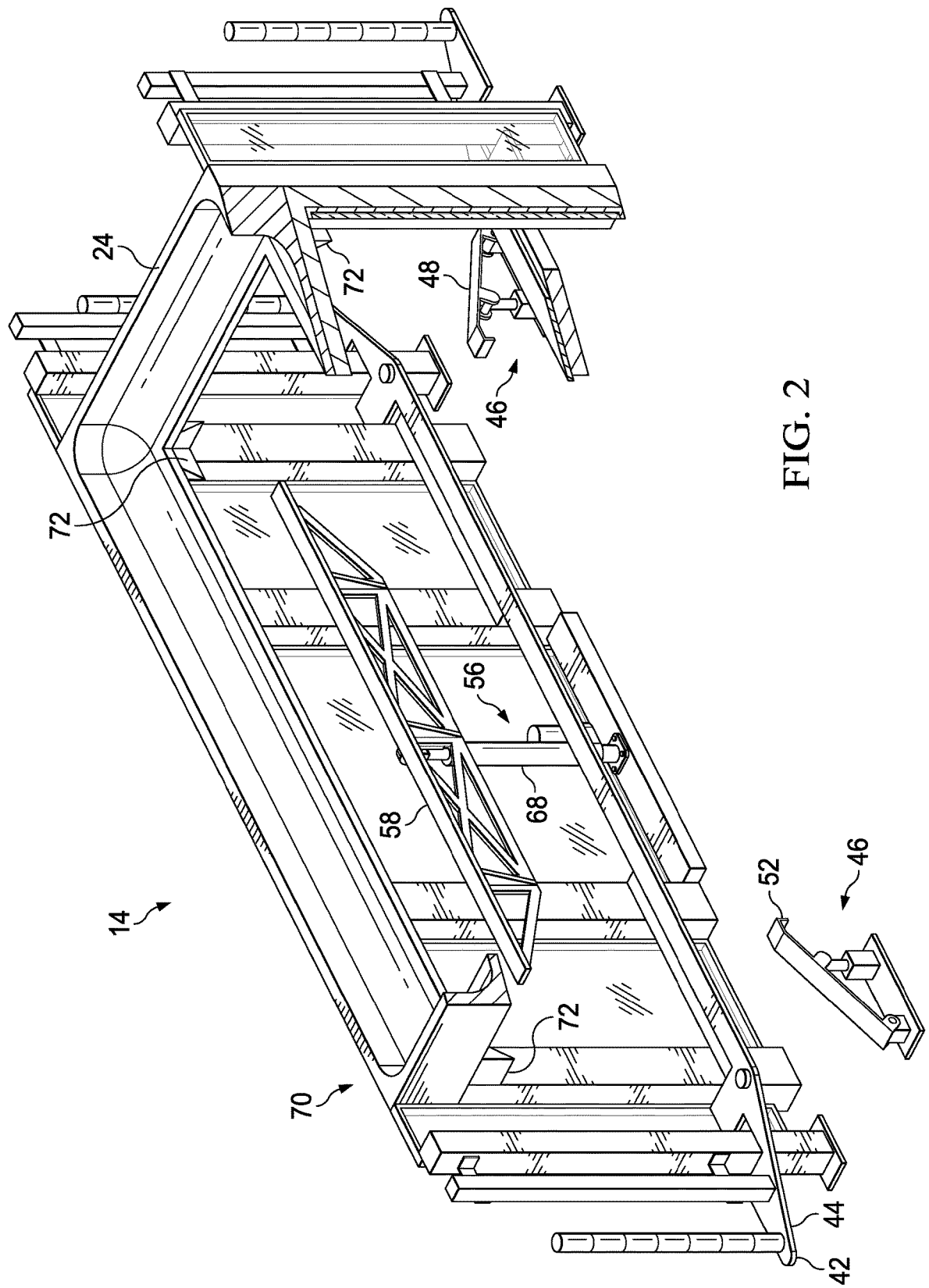
FIG. 2 depicts a cutaway view of the vacuum docking station of the vacuum press.
Figure 3:
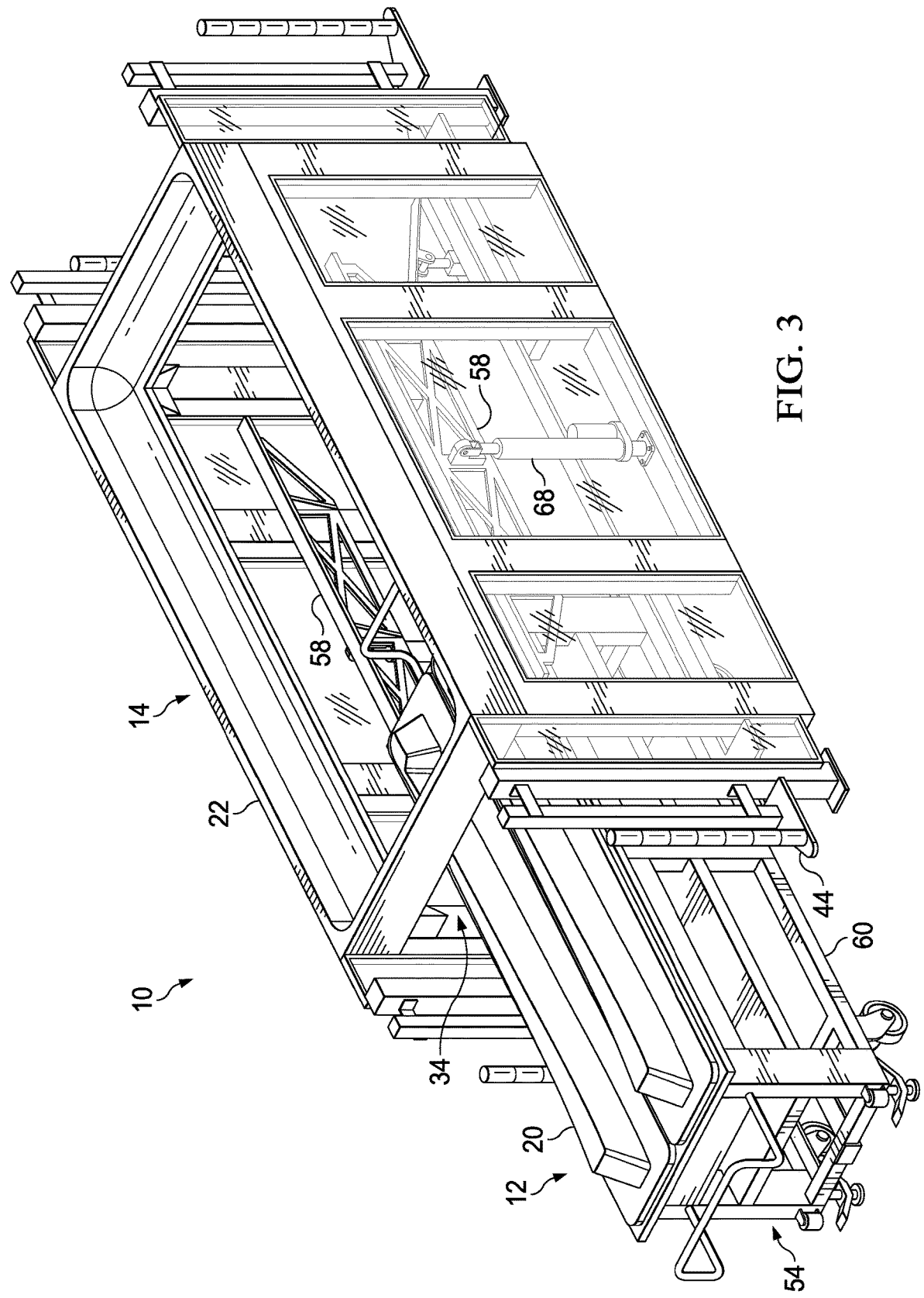
FIG. 3 depicts the mobile assembly entering the vacuum docking station.

In order to facilitate the rapid and automatic alignment of first platen 18 and second platen 26, vacuum press 10 can incorporate a plurality of locating devices that employ cooperation between mobile assembly 12 and vacuum docking station 14 to facilitate the alignment of first platen 18 and second platen 26 so that they can be appropriately positioned to sealingly engage with one another. The various components of the locating devices may be disposed on mobile assembly 12, on or in vacuum docking station 14, or on any suitable combination thereof For example, vacuum press 10 can incorporate a first locating device 42 that can be configured to guide mobile assembly 12 to a desired position with respect to the Y-axis as mobile assembly 12 translates along the X-axis into internal passage 34 of vacuum docking station 14. As shown in FIGS. 2 and 3 (flexible diaphragm 30 is omitted for clarity), vacuum docking station 14 can include a first locating device 42 that includes one or more tapered side rail members 44 along the sides of internal passage 34, where tapered side rail members 44 are configured to guide mobile assembly 12 into proper alignment along the Y-axis as mobile assembly 12 enters internal passage 34 of vacuum docking station 14. Tapered side rail members 44 can be configured to interact with the sides of mobile assembly 12, or with a bumper or other feature on mobile assembly 12 that is configured to cooperate with tapered side rail members 44 to position the mobile assembly, and therefore position first platen 18. Typically, tapered side rail members 44 can be configured so that a spacing between the two tapered side rail members 44 substantially corresponds to a width of mobile assembly 12, and that when mobile assembly 12 is disposed snugly between tapered side rail members 44, mobile assembly 12 is properly aligned with respect to the Y-axis.

Additionally, or in the alternative, vacuum press 10 can include a stop device 46 that can be configured to achieve and maintain a desired location for mobile assembly 12 along the X-axis while inside internal passage 34 of vacuum docking station 14. For example, vacuum docking station 14 can include a stop device 46 that includes a forward stop 48 that is configured to interact with a forward portion 50 of mobile assembly 12 in order to prevent mobile assembly 12 from proceeding beyond forward stop 48. Forward stop 48 can be located so that when mobile assembly 12 is stopped by and abuts forward stop 48, mobile assembly 12 is properly aligned with respect to the X-axis for first platen 18 and second platen 26 to sealingly engage each other.

Figure 4:
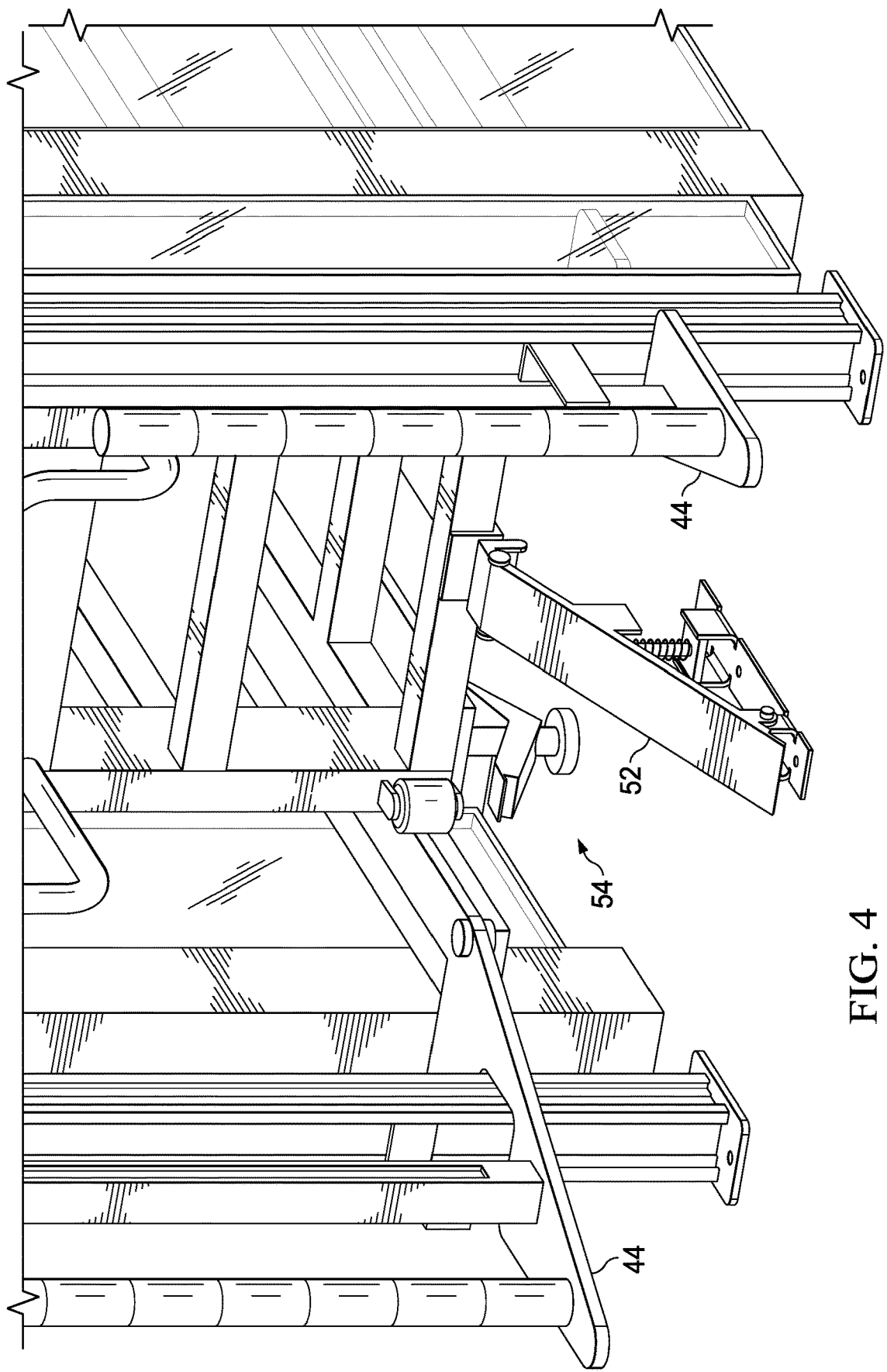
FIG. 4 depicts the rear stop of the vacuum press.

Stop device 46 can additionally include a rear stop 52 that is configured to permit mobile assembly 12 to pass beyond rear stop 52, but then to engage a rear portion 54 of mobile assembly 12 in order to prevent backwards movement of the mobile assembly along the X-axis (as shown in FIG. 4). Similar to the placement of tapered side rail members 44, forward stop 48 and rear stop 52 can be positioned and appropriately spaced so that when mobile assembly 12 is disposed snugly between forward stop 48 and rear stop 52, mobile assembly 12 is properly aligned with respect to the X-axis for first platen 18 and second platen 26 to sealingly engage each other.

Figure 6:
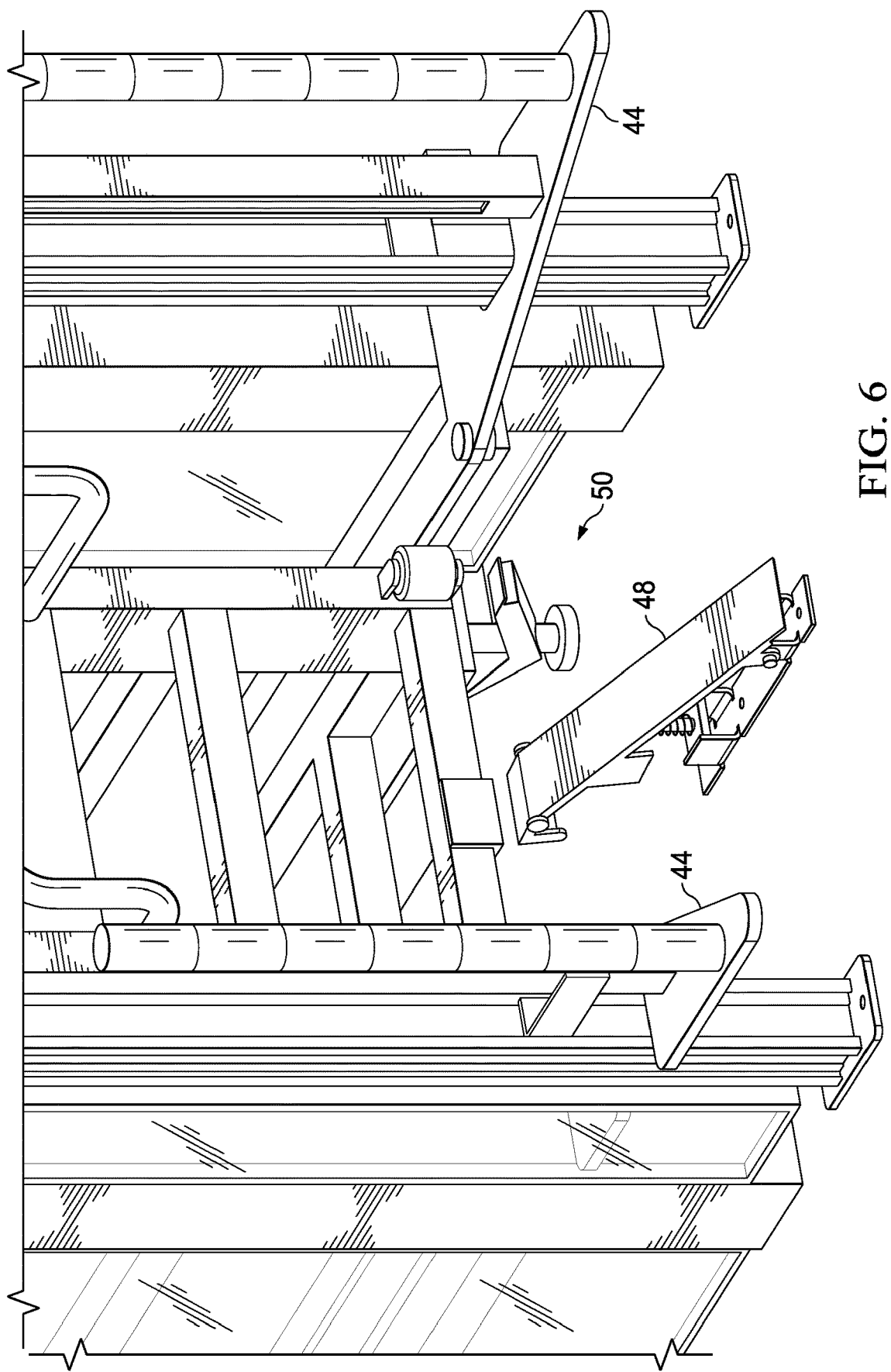
FIG. 6 depicts the forward stop in a disengaged position to permit the mobile assembly to move forward and exit the vacuum docking station.

Each of forward stop 48 and rear stop 52 can be biased such that mobile assembly 12 can readily enter internal passage 34 by displacing the stop. Upon moving beyond the stop, however, the bias urges the stop device upwardly to engage the corresponding end surface of mobile assembly 12 and to substantially prevent mobile assembly 12 from further translation along the X-axis. As shown in FIG. 6, at least forward stop 48 can be moved downward so as to disengage from the forward portion 50 of mobile assembly 12 and permit mobile assembly 12 to translate out of internal passage 34 and leave vacuum docking station 14.

Vacuum press 10 can further include a lifting device 56 that is configured to raise at least first platen 18 into sealing engagement with second platen 26 while mobile assembly 12 is positioned within internal passage 34. Lifting device 56 can be incorporated into either mobile assembly 12 or vacuum docking station 14. When lifting device 56 is a component of vacuum docking station 14, lifting device 56 can be configured to lift mobile assembly 12 while it is within internal passage 34. Typically, lifting device 56 is configured to engage with mobile assembly 12 at one or more points, and to lift mobile assembly 12 by means of that engagement.

As shown in FIGS. 2 and 3, lifting device 56 can include horizontal supports 58 disposed along the sides of internal passage 34, where horizontal supports 58 are configured to engage with one or both side portions 60 of mobile assembly 12. For example, horizontal supports 58 can be configured to engage a complementary projecting lip 62 of mobile assembly 12, where projecting lip 62 can be an extension of an upper surface 64 of mobile assembly 12. Projecting lip 62 can extend around the circumference of mobile assembly 12, can extend along opposing sides 60 of mobile assembly 12, or extend only along those regions of mobile assembly 12 that align with horizontal supports 58.

Figure 5A:
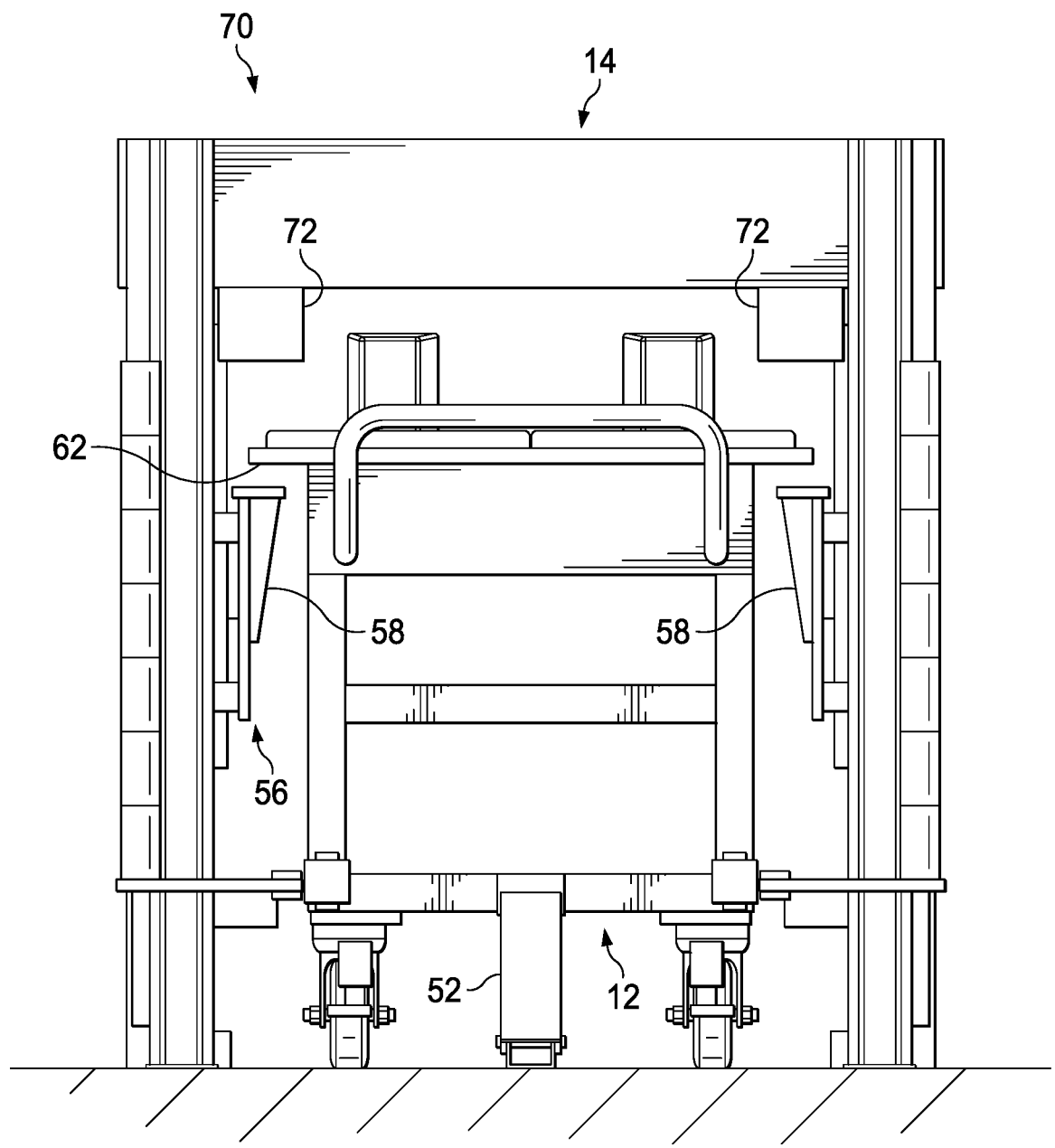
FIG. 5A is a rear elevation view of the vacuum press with the mobile assembly in position within the vacuum docking station.
Figure 5B:
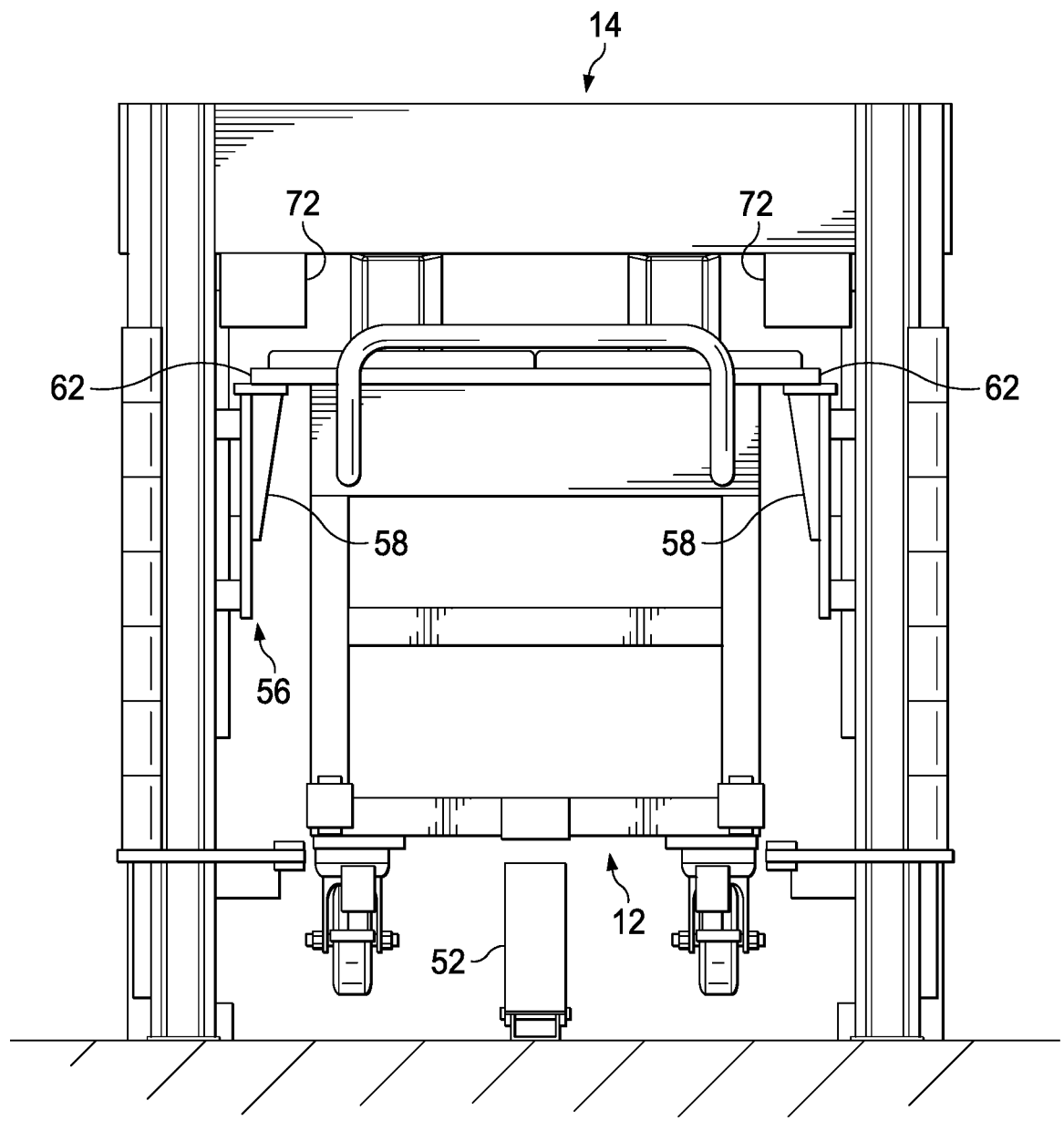
FIG. 5B shows the lifting device engaging the mobile assembly and urging it upward.
Figure 5C:
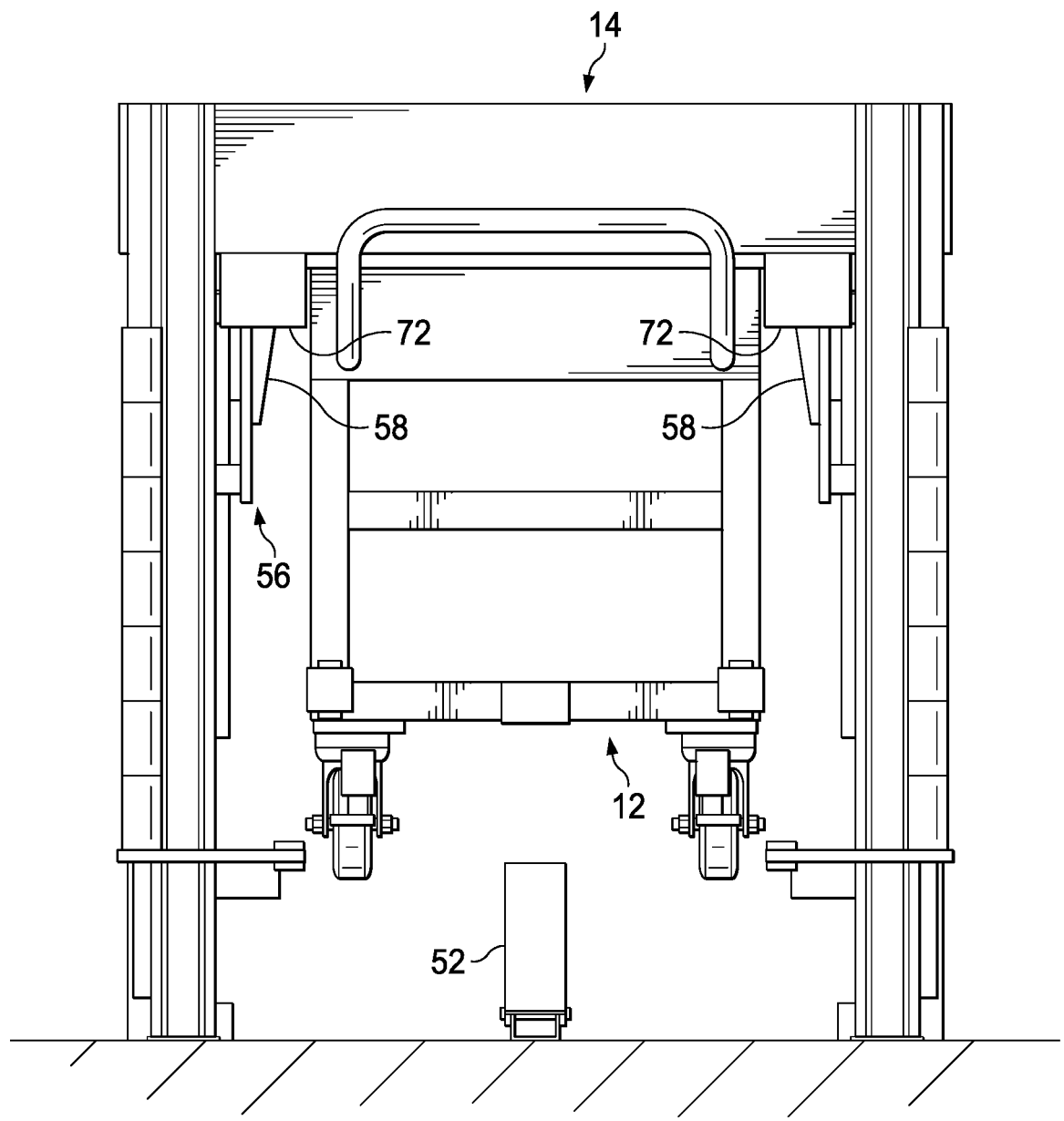
FIG. 5C shows the mobile assembly lifted into position so that the first and second platen can sealingly engage with each other.

Once mobile assembly 12 has been appropriately positioned along the X-axis by forward stop 48 and rear stop 52, and appropriately positioned along the Y-axis by tapered side rail members 44 of first locating device 42, lifting device 56 can urge first platen 18 toward second platen 26, as shown in FIGS. 5A-5C. Any mechanical means of elevating lifting device 56 is suitable for the purposes of the present disclosure. For example, horizontal supports 58 can be coupled to, one or more hydraulic cylinders 68 that are configured to elevate horizontal supports 58.

Vacuum press 10 can include a second locating device 70 that is configured to guide one of first platen 18 and second platen 26 along the Z-axis, so that the first platen and second platen are appropriately aligned to enter into sealing engagement with one other. Second locating device 70 can work in conjunction with, or separately from, first locating device 42 that acts to align mobile assembly 12 with respect to the Y-axis, and stop device 46 that acts to align mobile assembly 12 with respect to the X-axis, Second locating device 70 can be configured to guide one of the first platen 18 and second platen 26 to a desired location along both of the X- and Y-axes as one of the first and second platens moves along the Z-axis into a sealing engagement with the other platen. Second locating device 70 can be incorporated onto mobile assembly 12, incorporated onto vacuum docking station 14, or include portions on both mobile assembly 12 and vacuum docking station 14. Typically, where the movable platen is disposed on or coupled to mobile assembly 12, second locating device 70 will be disposed on or coupled to vacuum docking station 14, so that second locating device 70 can effectively guide the moving platen into alignment with the non-moving platen.

Second locating device 70 can be configured to act upon first platen 18 as it is lifted upward toward second platen 26 directly or indirectly by lifting device 56. For example as shown in FIG. 2 and FIGS. 5A-5C, second locating device 70 can include one or more tapered corner members 72 disposed adjacent the path of the moving platen, with the walls of the tapered corner members 72 being inclined inwardly sufficiently that as the moving platen is lifted into a engagement with the tapered corner members, the moving platen is guided into a final and substantially fully aligned position with respect to the stationary platen. For vacuum press 10, tapered corner members 72 serve to guide first platen 18 into substantially full alignment with second platen 26, so that first platen 18 can be sealed and engaged with second platen 26.

Figure 8:
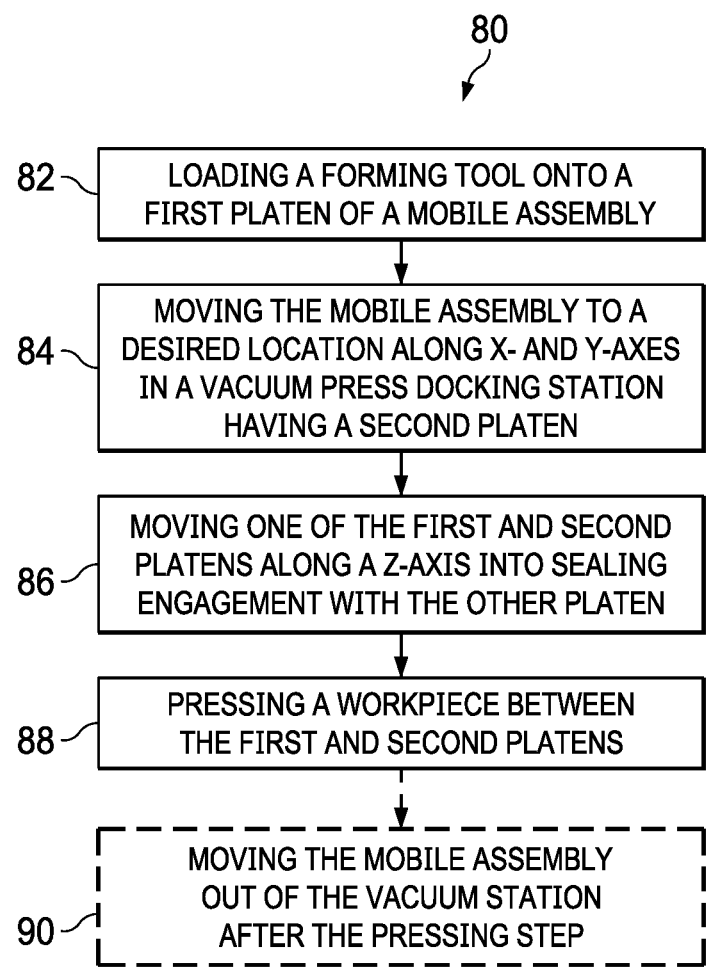
FIG. 8 is a flowchart setting out an illustrative method of pressing a workpiece using a vacuum press according to the present disclosure.

The vacuum presses of the present disclosure lend themselves to a method of pressing a workpiece, as set out in flowchart 80 of FIG. 8. The illustrative method may include loading a forming tool onto a first platen of a mobile assembly, as set out at 82 of flowchart 80; moving the mobile assembly to a desired location along X- and Y-axes in a vacuum press docking station having a second platen, as set out at 84 of flowchart 80; moving one of the first and second platens along a Z-axis into sealing engagement with the other platen, set out at 86 of flowchart 80; and pressing a workpiece between the first and second platens, as set out at 88 of flowchart 80.

The recited method of pressing a workpiece optionally further includes moving the mobile assembly out of the vacuum press station after the pressing step, as set out at 90 of flowchart 80. In some instances, the mobile assembly includes a cart, and the step of moving the mobile assembly out of the vacuum press station after the pressing step includes wheeling the cart into the vacuum press station.

In some instances, the vacuum press station includes a table portion having a slot configured to receive the first platen, and the step of moving one of the first and second platens along a Z-axis includes lifting the first platen into the slot of the table portion.

In some instances, the step of moving one of the first and second platens along a Z-axis includes lifting the mobile assembly toward the second platen.

Typically, the vacuum presses of the present disclosure are employed to compress and consolidate composite materials prior to their final curing. However, if the vacuum press were equipped with a heating element of some kind, and the components of the vacuum press were sufficient tolerant of the temperatures required, the composite materials could be cured while they are under compression within the vacuum press.

Illustrative Combinations and Additional Examples

This section describes additional aspects and features of the disclosed vacuum press, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A vacuum press comprising: a mobile assembly including a first platen, a vacuum docking station including a second platen, a first locating device configured to guide the mobile assembly to a desired location along a Y-axis as the mobile assembly moves along an X-axis into the vacuum docking station, and a second locating device configured to guide one of the first and second platens along a Z-axis into sealing engagement with the other platen.

A2. The vacuum press of paragraph A1, wherein the second locating device is configured to guide one of the first and second platens to a desired location along the X- and Y-axes as one of the first and second platens moves along the Z-axis into sealing engagement with the other platen.

A3. The vacuum press of paragraph A1, wherein the second locating device is configured to guide the first platen vertically upward toward the second platen.

A4. The vacuum press of paragraph A1, wherein the second locating device is configured to guide the second platen downward toward the first platen.

A5. The vacuum press of paragraph A1, wherein the mobile assembly has wheels for moving the first platen across a floor.

A6. The vacuum press of paragraph A1, further comprising: a lifting device configured to raise the first platen into sealing engagement with the second platen.

A7. The vacuum press of paragraph A6, wherein the lifting device is located at the vacuum docking station, and is configured to lift the mobile assembly.

A8. The vacuum press of paragraph A6, wherein the lifting device engages opposite side portions of the mobile assembly.

A9. The vacuum press of paragraph A1, wherein the mobile assembly is configured to carry forming tools into the vacuum docking station.

A10. The vacuum press of paragraph A1, wherein the second platen includes a flexible diaphragm.

A11. The vacuum press of paragraph A1, wherein the vacuum docking station includes a stop device for maintaining a desired location of the mobile assembly along the X-axis inside the vacuum docking station.

A12. The vacuum press of paragraph A1, wherein the vacuum docking station includes a table portion having a slot configured to receive the first platen from the mobile assembly.

A13. The vacuum press of paragraph A1, wherein the vacuum docking station has first and second opposing ends, the first opposing end being configured to receive the mobile assembly into the vacuum docking station, and the second opposing end being configured to allow exit of the mobile assembly from the vacuum docking station after a pressing procedure.

A14. The vacuum press of paragraph A1, wherein the first locating device includes tapered side rail members for guiding the mobile assembly into the vacuum docking station.

A15. The vacuum press of paragraph A1, wherein the second locating device includes tapered corner members for guiding the first platen into sealing engagement with the second platen.

B1. A method of pressing a workpiece, comprising: loading a forming tool on to a first platen of a mobile assembly, moving the mobile assembly to a desired location along X and Y axes in a vacuum press docking station having a second platen, moving one of the first and second platens along a Z-axis into sealing engagement with the other platen, and pressing a workpiece between the first and second platens.

B2. The method of paragraph B1, further comprising: moving the mobile assembly out of the vacuum press docking station after the pressing step.

B3. The method of paragraph B1, wherein the mobile assembly includes a cart, the moving step including wheeling the cart into the vacuum press docking station.

B4. The method of paragraph B1, wherein the vacuum press docking station includes a table portion having a slot configured to receive the first platen, the step of moving one of the first and second platens along a Z-axis includes lifting the first platen into the slot of the table portion.

B5. The method of paragraph B1, wherein the step of moving one of the first and second platens along a Z-axis includes lifting the mobile assembly toward the second platen.

C1. A vacuum press comprising: a mobile assembly including a first platen, and a stationary pressing station including a table portion having a slot and a second platen mounted over the slot, wherein the mobile assembly is configured to carry a pre-loaded tool on the first platen along at least two orthogonal axes into a vacuum chamber formed by sealing engagement of the first and second platens.

C2. The vacuum press of paragraph C1, wherein the mobile assembly is configured to carry the pre-loaded tool along at least three orthogonal axes.

C3. The vacuum press of paragraph C1, further comprising: a lifting device configured to lift the mobile assembly toward the table portion.

C4. The vacuum press of paragraph C1, further comprising: a lifting device configured to lift the first platen into sealing engagement with the second platen.

Advantages, Features, and Benefits

The different examples of the vacuum presses, and methods of pressing a workpiece using the vacuum presses described herein provide several advantages over known solutions for problems associated with vacuum pressing of composite workpieces.

The vacuum presses disclosed and described herein allow forming tools and molds to be housed and transported on a mobile trolley that can be directly interfaced with a vacuum press. The trolley can be designed to interface with the vacuum press in such a way that the trolleys can be wheeled into position under the upper platen. The trolley then forms the base of the press and can be raised into position through mechanical means, thereby avoiding any manual handling of the tools, or requiring the use of overhead equipment.

In addition to reducing tool manipulation and lifting, the disclosed vacuum presses enhance and simplify the plated alignment procedure, as alignment of the lower and upper platen becomes essentially automatic. This further speeds the composite manufacturing process.

No known vacuum press possesses these advantageous properties. However, not all examples described herein may provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of pressing a workpiece, comprising:
loading a forming tool on to a first platen of a mobile assembly,
moving the mobile assembly to a desired location along X and Y axes in a vacuum press docking station having a second platen,
moving the first platen along a Z-axis into sealing engagement with the second platen, and
pressing a workpiece between the first and second platens;
wherein the step of moving the first platen along the Z-axis includes lifting the mobile assembly toward the second platen, and wherein the mobile assembly includes wheels to contact a floor, and lifting the mobile assembly includes lifting the wheels of the mobile assembly off the floor.

2. The method of claim 1, further comprising:
moving the mobile assembly out of the vacuum press docking station after the pressing step.

3. The method of claim 1, wherein the mobile assembly includes a cart, the moving step including wheeling the cart into the vacuum press docking station.

4. The method of claim 1, wherein the vacuum press docking station includes a table portion having a slot configured to receive the first platen, and the step of moving the first platen along the Z-axis includes lifting the first platen into the slot of the table portion.

5. The method of claim 1, wherein moving the mobile assembly to a desired location along X and Y axes in the vacuum press docking station includes guiding the first platen along the Y-axis with a first locating device of the vacuum press docking station.

6. The method of claim 5, wherein moving the mobile assembly to a desired location along X and Y axis in the vacuum press docking station further includes preventing the mobile assembly from proceeding along the X-axis with a stop device of the vacuum press docking station.

7. The method of claim 6, wherein moving the first platen along the Z-axis into sealing engagement with the second platen includes guiding the first platen along the Z-axis with a second locating device of the vacuum press docking station.

8. The method of claim 1, wherein moving the mobile assembly to the desired location includes moving the mobile assembly into a first end of the vacuum press docking station, and further including moving the mobile assembly out of a second, opposing end of the vacuum press docking station after the pressing step.

9. A method of pressing a workpiece, comprising:
loading a forming tool on to a first platen of a mobile assembly,
moving the mobile assembly into a vacuum press docking station having a second platen,
guiding the first platen along a Y-axis with a first locating device of the vacuum press docking station,
guiding the first platen along a Z-axis with a second locating device of the vacuum press docking station, into sealing engagement with the second platen, and
pressing a workpiece between the first and second platens;
wherein the secondary locating device includes a pair of horizontal supports on opposite sides of the docking station, the horizontal supports being fixed along the Y-axis, and moveable only along the Z-axis, wherein the guiding step includes engaging the horizontal supports with a pair of projecting lips of the mobile assembly.

10. The method of claim 9, wherein the first locating device includes tapered side rail members for guiding the mobile assembly into the vacuum docking station.

11. The method of claim 10, wherein the second locating device includes tapered corner members for guiding the first platen into sealing engagement with the second platen.

12. The method of claim 9, further including preventing the mobile assembly from proceeding along the X-axis with a first stop device of the vacuum press docking station.

13. The method of claim 9, further including allowing the mobile assembly to pass beyond a stop device, and then engaging a rear portion of the mobile assembly with the stop device to prevent backwards movement of the mobile assembly.

14. The method of claim 9, wherein moving the mobile assembly into a vacuum press docking station includes moving the mobile assembly into a first end of the vacuum press docking station, and further including moving the mobile assembly out of a second, opposing end of the vacuum press docking station after the pressing step.

15. The method of claim 9, wherein guiding the first platen along the Z-axis includes lifting the first platen with a lifting device of the vacuum press docking station.

16. The method of claim 15, wherein the lifting of the first platen includes lifting the entire mobile assembly with the lifting device.

17. The method of claim 9, further including curing the workpiece in the vacuum press docking station.

18. A method of pressing a workpiece, comprising:
moving a mobile assembly into a vacuum press docking station, the mobile assembly including a first platen, the vacuum press docking station including a second platen,
moving the mobile assembly to a desired location in the vacuum press docking station, arresting movement of the mobile assembly relative to the vacuum press docking station between a pair of stop devices, wherein each stop device is spring biased to permit movement of the mobile assembly into the vacuum press docking station and then stopping reverse movement when the mobile assembly is in the desired X-axis location of the vacuum press docking station, lifting the entire mobile assembly, such that the first platen is raised into sealing engagement with the second platen, and pressing a workpiece between the first and second platens.

19. The method of claim 18, further comprising:

moving the mobile assembly out of the vacuum press docking station after the pressing step.

20. The method of claim 18, wherein moving the mobile assembly to the desired location includes moving the mobile assembly into a first end of the vacuum press docking station, and further including moving the mobile assembly out of a second, opposing end of the vacuum press docking station after the pressing step.

\* \* \* \* \*